Nov. 2, 1965   W. KIRCHNER ETAL   3,214,968
METHOD OF AND DEVICE FOR THE MEASURING OF HERTZ SURFACES
Filed Jan. 14, 1963   2 Sheets-Sheet 1

Inventors
Willi Kirchner
Heinz Korrenn
By Stevens, Davis, Miller & Mosher
Attorneys United States Patent Office 3,214,968
Patented Nov. 2, 1965

3,214,968
METHOD OF AND DEVICE FOR THE
MEASURING OF HERTZ SURFACES
Willi Kirchner, Schwebheim, Obere Heide, and Heinz
Korrenn, Schweinfurt, Germany, assignors to Kugelfischer Georg Schafer & Co., Schweinfurt, Germany
Filed Jan. 14, 1963, Ser. No. 251,142
Claims priority, application Germany, Feb. 1, 1962,
K 45,805
6 Claims. (Cl. 73—88)

The invention relates generally to a method and apparatus for determining deformations in articles due to pressure applied thereto, and more particularly is concerned with a method and apparatus for determining elastic deformations in Hertz contact regions.

If two bodies are pressed together, of which at least one has a convex surface, the contact region usually has an elliptical outline. The surfaces engaged with each other in the contact region are called Hertz surfaces. The formulas set up by Hertz describe the conditions prevailing in a Hertz contact region are valid under the assumption that the dimensions of the contact region are very small as compared with the dimensions of the two bodies engaging each other, that the limit of elasticity is not exceeded and that pressure acts upon the surfaces in the contact region only in a direction normal thereto.

About the turn of the century doubts arose as to the correctness of Hertz's formulas for the first time when the hardness of test members was measured in connection with cylinders and balls. Since that time, many attempts were made to correct Hertz's equations theoretically. But it was tried only very rarely to obtain indications about the form and dimension of Hertz contact regions by the way of actual experiments. Merely the approach of two bodies pressed against each other under load was investigated in detail. This, however, does not furnish any information with respect to the pressure surfaces themselves. By an exact knowledge of shape and dimension of the pressure surfaces however, valuable results are achieved as to the characteristics of tensions in the marginal zones of the bodies pressed against each other and as to the properties of the material involved. Since Hertz contact surfaces are formed only when the bodies are subjected to elastic deformations and only as long as the two bodies are pressed against each other, they can also be determined only under these particular conditions.

It is therefore an object of this invention to provide a method for measuring the deformations actually prevailing in Hertz contact regions formed between two bodies pressed against each other, without depending on theoretical equations.

It is another object of this invention to provide an apparatus for detecting the deformations of a first test member caused by a second test member pressed against the first in a Hertz contact region, while the Hertz contact region is actually formed.

It is a further object of this invention to provide an apparatus for the investigation of Hertz contact regions that permits ascertaining readily and precisely the characteristics prevailing in a Hertz contact region formed between two test bodies pressed against each other.

It is another object of this invention to provide an apparatus for measuring the elastic deformations in Hertz contact regions of two test bodies while contacting each other, such measurements also being dependent upon changes of their relative position.

Further objects and advantages of this invention will become apparent from the following description of a preferred embodiment of this invention in connection with the accompanying drawings in which.

Figure 1:
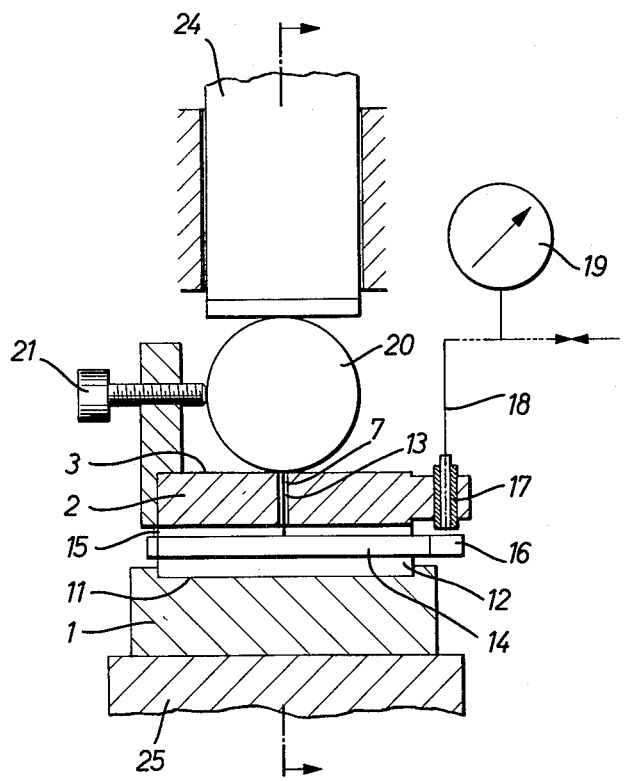
FIGURE 1 is a fragmentary cross-sectional view through an apparatus for determining elastic deformation in Hertz contact regions, according to this invention.
Figure 2:
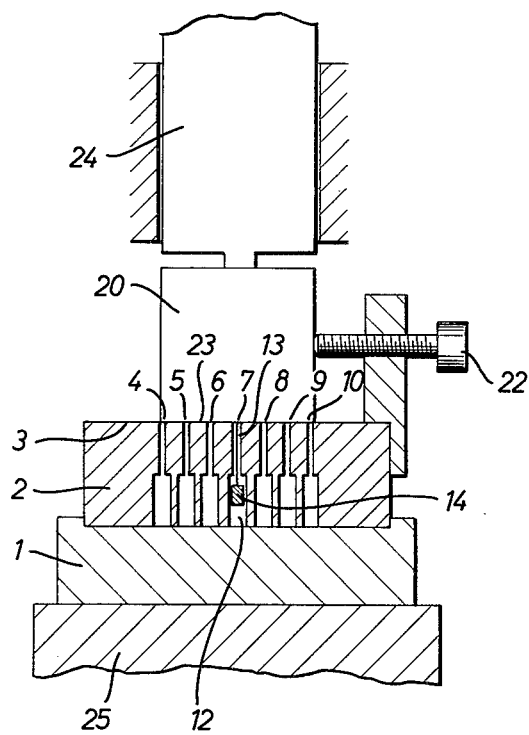
FIGURE 2 is a cross-sectional view along the center line in FIGURE 1.

As shown in the drawing, the test plate 2 is fastened on a base plate 1. The test plate has on its upper surface 3, in the shown embodiment, seven fine bore holes 4 to 10 perpendicular to its surface. In FIG. 1 only the bore hole 7 is shown. Each bore opens into a longitudinal slot 12 machined in the lower surface 11 of the test plate 2. In each one of the fine bore holes 4 to 10 there is arranged one moveable measuring pin 13, which acts upon a respective measuring lever 14 pivotally mounted within slot 12 by means of a leaf spring 15. The front extremity 16 of each measuring lever 14 controls the effective cross-section of a measuring nozzle 17 fastened in the test plate 2, so that pressure differences arise in a known manner in the schematically shown pneumatic system 18, which are indicated by the manometer 19. For reasons of clarity, only one representative measuring lever 14 is shown. It is suitable to use manometers of the liquid type, with vertical and straight scales that allow for a very clear reading. On the upper surface 3 of the test plate 2 there is located the test body 20, in the embodiment shown, a cylindrical roller. Roller 20 is held in its position by the stop members 21 and 22, threaded adjustably into frame parts connected with base plate 2.

Test body 20 normally is arranged relative to test plate 2 in such a way that its generating line 23 coincides exactly with a line extending through the centers of the fine bore holes 4 to 10, whereby all the measuring pins 13 contact the test body 20 along line 23.

The structure described is associated with a device capable of applying a desired amount of pressure thereto. The pressure applying cylinder 24 thereof is visible above the schematically shown supporting table 25.

To accomplish the measuring process a gage block is placed on the upper surface 3 of the test plate 2 and all manometers 19 are zeroed by shifting the respective measuring nozzles 17. Thereafter, test body 20 is deposited on surface 3 instead of the gage block and the desired load is applied thereto. Accordingly, test body 20 is pressed into surface 3, thereby elastically deforming test plate 2. Measuring pins 13 are shifted downward and the distance traveled by the individual pins 13 is shown on the respective manometers 19. When liquid manometers are used with straight, vertical scales, as mentioned above, and all scales are arranged parallel with each other and at the same level, a profile line is formed by the upper levels of the individual liquid columns in the manometers representative of the pressure distribution in the investigated Hertz contact region. The shifting of the test body 20 by means of stop member 21, which can be adjusted in a measurable manner, makes possible the recording of further profile sections parallel to each other. By shifting the test body 20 in an axial direction by means of stop member 22, which likewise can be adjusted in a measurable manner, also the effect of pressure acting on off-center portions of test body 20 on dimensions and form of the Hertz contact region can be investigated.

We claim:

1. A device for determining elastic deformations in Hertz contact regions, comprising a test body with a first contact surface, a test plate having a second contact surface normally receiving said test body with said first contact surface in said Hertz contact region in a first position, said test plate provided with a plurality of fine bores located within said contact region, said bores being spaced from each other and opening into said region, pins being axially moveably arranged within each of said bores, one end of each of said pins engaging said first contact surface in said first position, means to press said test body against said test plate, thereby deforming said test plate and said test body within said Hertz contact region and displacing said pins from said first position into a second position, and means to measure the respective displacement of each of said pins from said first position to said second position.

2. The device of claim 1, wherein said displacement measuring means is formed by levers connected to the other ends of said pins, and by pneumatic measuring circuits including nozzles and indicating means, said levers being adapted to control said nozzles of said measuring circuits according to the respective displacements of said pins.

3. A device according to claim 2, wherein said indicating means is formed by a liquid manometer.

4. A device according to claim 1, comprising furthermore shifting means to move said test body while under pressure in a measurable manner along said test plate from one position relative to said test plate to another position in a direction transverse with respect to the direction in which said test body is pressed against said test plate.

5. A method of determining elastic deformations in Hertz contact regions defined between a first contact surface of a test body and a second contact surface of a test plate, comprising the steps of engaging said first and said second contact surface with each other in a first position, applying a test pressure to force said test body against said test plate thereby to displace said first contact surface from said first position into a second position under deformation of said test plate in said Hertz contact region, and pointwise directly measuring within said Hertz contact region the displacement of said first contact surface into said second position with respect to said first position.

6. A device for determining elastic deformations in Hertz contact regions, comprising a test body having a first contact surface, a test plate having a second contact surface, said test body normally engaging said second contact surface with its first contact surface in a first position, means to press said test body against said test plate thereby to displace said first contact surface from said first position under elastic deformation of said test plate into a second position, and means pointwise to measure within said Hertz contact region directly the displacement of said first surface into said second position with respect to said first position.

References Cited by the Examiner

UNITED STATES PATENTS

| | | | |
|---|---|---|---|
| 2,374,105 | 4/45 | Kraus | 73—172 |
| 2,489,904 | 11/49 | Kratzer | 73—94 |
| 2,858,615 | 11/58 | Aller | 33—174 |
| 2,932,968 | 4/60 | Scoville | 73—172 |
| 2,976,725 | 3/61 | Byer | 73—172 |
| 3,106,837 | 10/63 | Plumb et al. | 73—88 X |

LOUIS R. PRINCE, *Primary Examiner.*

D. SCHONBERG, RICHARD C. QUEISSER,
*Examiners.*